United States Patent [19]

Katagiri et al.

[11] Patent Number: 5,128,750
[45] Date of Patent: Jul. 7, 1992

[54] TELEVISION SIGNAL CONVERTER FOR CONVERTING A HIGH DEFINITION TELEVISION SIGNAL INTO A TELEVISION SIGNAL FOR DISPLAY BY A STANDARD TELEVISION RECEIVER

[75] Inventors: Takato Katagiri, Fukaya; Hidenori Tsuboi, Fukaya, both of Japan

[73] Assignee: Kabushiki Kaisha Toshiba, Kawasaki, Japan

[21] Appl. No.: 552,297

[22] Filed: Jul. 13, 1990

[30] Foreign Application Priority Data

Jul. 14, 1989 [JP] Japan .................. 1-181762

[51] Int. Cl.⁵ .................. H04N 11/06; H04N 7/12
[52] U.S. Cl. .................. 358/12; 358/135; 358/136
[58] Field of Search .................. 358/135, 136, 11, 12, 358/138

[56] References Cited

U.S. PATENT DOCUMENTS

| | | | |
|---|---|---|---|
| 4,794,447 | 12/1988 | Tsinberg | 358/12 |
| 4,882,613 | 11/1989 | Masumoto | 358/138 |
| 4,884,138 | 11/1989 | Storey | 358/138 |
| 4,942,466 | 7/1990 | Sandbank et al. | 358/133 |
| 4,974,064 | 11/1990 | Tsinberg | 358/12 |
| 4,979,040 | 12/1990 | Masumoto | 358/138 |
| 4,989,091 | 11/1991 | Lucas | 358/11 |

Primary Examiner—John K. Peng
Attorney, Agent, or Firm—Cushman, Darby & Cushman

[57] ABSTRACT

According to the present invention, in a simple MUSE processing circuit, a high-definition television signal, which is band-compressed by an offset subsampling circulating in a field, is converted into a simple high Definition television signal, which is not a complete high Definition television signal, by superposing fields which are fewer than fields n. In a scanning line processing device, the simple high Definition television signal is converted into a first sequential scanning signal with at least the same number of scanning lines as the television signal in the present system. The first sequential scanning signal obtained by the scanning line processing device can be used as a Extended Definition television signal as it is. Also, in an interlaced converter, the first sequential scanning signal obtained by said scanning line processing device is converted into a first interlaced scanning signal which can be used in the television receiver in the present system.

11 Claims, 6 Drawing Sheets

TELEVISION SIGNAL CONVERTER FOR CONVERTING A HIGH DEFINITION TELEVISION SIGNAL INTO A TELEVISION SIGNAL FOR DISPLAY BY A STANDARD TELEVISION RECEIVER

BACKGROUND OF THE INVENTION

1. Field of the Invention

This invention relates to a television signal converter which can easily convert a television signal in MUSE system into a television signal, which can be produced by a television receiver in a present system.

2. Description of the Related Art

With advance of digital ICs, particularly the high speed of the memory, a large capacity of memories, and the low cost of manufacture, digital processing circuits for image signals have come into wide use. In addition, it has allowed for wider television screens, as well as higher definition.

On the other hand, a high-definition television system (MUSE system), which is completely different from the signals in the present system, has been developed. The MUSE system is disclosed in INTERNATIONAL BROADCASTING SYMPOSIUM ON RADIO AND TELEVISION ENGINEERING 1985 SESSION 2-(7) "Transmission of HDTV by MUSE system" by Yuichi Ninomiya et al.

In this system, since the signal band of this system is five times greater than that of the conventional television signal, the band-compression of the signal is performed in order that the signal transmission can be performed in the signal band corresponding to one channel of a broadcasting satellite. In this system, the band compression is performed by offset sampling the high-definition television signal between the fields and between the frames.

Therefore, since the television signal in the MUSE system is completely different from the signal in the present system, the image in the MUSE system cannot be output by the existing television receiver. Moreover, in order to receive the signal in the MUSE system and output the signal, a MUSE decoder, which has a large capacity of memories such as a frame memory, is required. As a result, in order to receive the signal in the MUSE system, a common user must purchase a MUSE decoder, which is completely different from the ordinary system, and is also more expensive. Therefore, the common user must bear a large expenditure of money.

Thus, the MUSE decoder, which can easily convert the signals in the MUSE television system into the signals in the present system, has been required.

SUMMARY OF THE INVENTION

An object of the present invention is to provide a television signal converter for the MUSE system which can convert a signal from the MUSE system into a television signal more suitable to the simpler structure of the present system.

To attain the above object, the present invention provides a television signal converter, which comprises a scanning line converting means in which a high-definition television signal, which is band-compressed by an offset subsampling circulating in 4 fields, is supplied from an input terminal and the high-definition television signal is converted into a first sequential (non-interlaced) scanning signal with at least the same number of scanning lines as that of the television signal in the present system; leading means, which introduce the first sequential scanning signal obtained by the scanning line converting means; and an interlaced converting means, which converts the first sequential scanning signal obtained by the scanning line converting means into a first interlaced scanning signal in the present system.

Furthermore, another object of the present invention is to provide a television signal converter, which can reduce a flicker of the first interlaced scanning signal obtained by the interlace converting means.

To attain the above object, the first interlaced scanning signal is supplied to an interframe adding circuit, and the output thereof is taken up as a second interlaced scanning signal.

Furthermore, another object of the present invention is to provide a television signal converter utilizing a sequential scanning signal the high-definition television receiver by use of the second interlaced scanning signal obtained from the above interframe adding circuit.

To attain the above object, the present invention comprises a sequential scanning converting means in which an interpolation signal is generated by use of the second interlaced scanning signal. The interpolation signal and the second interlaced scanning signal are both converted at double speed and the two signals, which are converted at double speed, are alternately selected, thereby introducing a second sequential scanning signal.

Moreover, another object of the present invention is to provide a television signal converter in which a horizontal low-band component of the second sequential scanning signal is substituted for that of the first sequential scanning signal in order to emphasis the vertical high-band component of the second sequential scanning signal, thereby obtaining a high definition television signal having a high quality.

To attain the above object, the present invention comprises a low-band substituting circuit in which the second sequential scanning signal and the first sequential scanning signal are supplied.

DETAILED DESCRIPTION OF THE PREFERRED EMBODIMENTS

The present invention will be explained with reference to the drawings.

Figure 1:
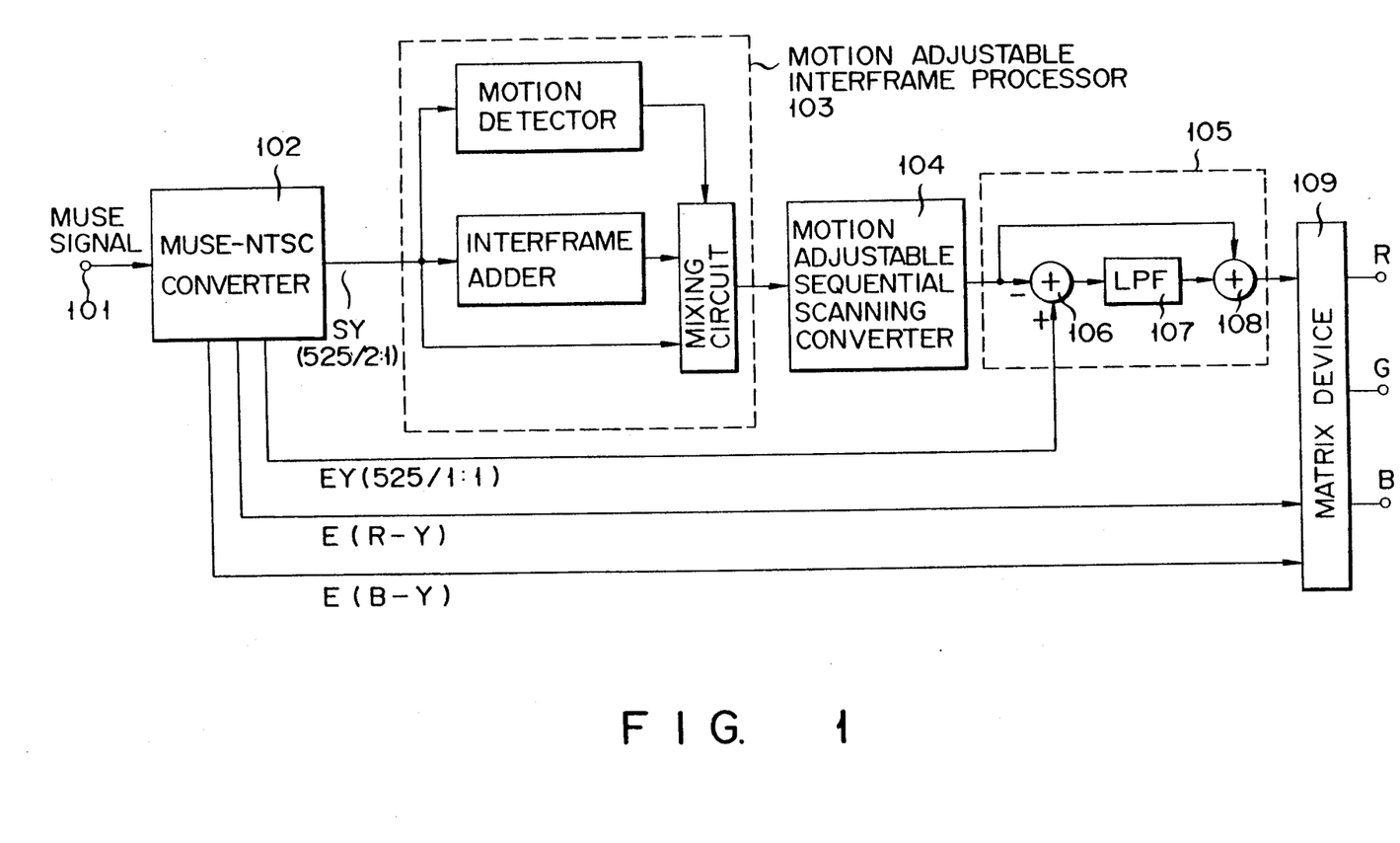
FIG. 1 is a structural view showing one embodiment of the present invention.

FIG. 1 shows one embodiment of the present invention. A MUSE signal is supplied to an input terminal 101 of a MUSE-NTSC converter 102. The MUSE signal is a high-definition television signal, which is band-compressed by an offset subsampling circulating in four fields. The MUSE-NTSC converter 102 simply processes the MUSE signal, and generates a luminance signal and a color-difference signal.

The reason why the MUSE-NTSC converter 102 simply processes the MUSE signal is because in the MUSE system, an image signal of one frame is separated into four fields, and transmitted as a MUSE signal. Therefore, in order to normally use data of the MUSE signal, it is necessary to superpose for data of the four fields. However, in order to superpose the data for the four fields, the large number of memories is required and the cost is increased.

In the MUSE-NTSC converter 102, data for one field is used as data for generating an image signal for another field. For this purpose, the technique of an intrafield interpolation process is used. Thereby, the MUSE-NTSC converter 102 can be realized at lower cost. The signal intrafield-interpolated is TCI-decoded and converted into luminance signal SY (1125/2:1) and color-difference signals (R-Y) and (B-Y). (TCI; Time Compressed Integration). Moreover, the luminance signal SY and the color-difference signals (R-Y) and (B-Y) are converted by scanning line converting means and the interlace converting means, and introduced from the MUSE-NTSC converter 102 as signals (525/2:1) S (R-Y) and S (B - Y). The above processed luminance signal SY is called an S terminal luminance signal thereafter. FIG. 1 shows only the S terminal luminance signal SY.

Moreover, in the MUSE-NTSC converter 102, the MUSE signal is intrafield-interpolated, and the obtained signal is TCI-decoded. Then, the TCI-decoded signal is converted by the scanning line converting means. As a result, the obtained signals are signals (525/1:1) (non-interlaced signal), that is, luminance signals EY, color-difference signals E (R - Y) and E (B - Y).

Therefore, according to the above-mentioned MUSE-NTSC converter 102, a sequential scanning signal and an interlaced scanning signal can be obtained. The interlaced scanning signal is helpful when supplied to the television receiver in the present system. Also, the sequential scanning signal can be directly used in the present Extended Definition television. Therefore, according to the MUSE-NTSC converter 102, two kinds of television signals can be obtained and such a converter can be easily used. As a Extended Definition television receiver, there is disclosed "System & Technological Details of Terres Trial/Cable NTSC Compatible HDTV" described in IEEE Transaction Consumer Electronics, Vol. 35, No. 3, Aug., 1989.

Moreover, the system of the present invention is structured to improve the quality of the sequential scanning signal.

S terminal luminance signals SY (525/2:1) are input to a motion adjustable interframes processor 103. The motion adjustable interframe processor 103 performs the separation of the luminance and the color-difference signals by forcibly using the correlation between the frames. The drawing shows only S terminal luminance signal SY system to clarify the explanation. The luminance signal SY is processed by the portion between the frames, thereby a flicker component is removed therefrom.

S terminal luminance signal SY, which is obtained because the MUSE signal is simply processed, includes a horizontal high-band component (flicker component) which flickers between the frames. However, the flicker component generated between the frames is reduced by the processor 103 which obtains the luminance signal by adding the signals between frames. Thereby, the quality of S terminal luminance signal SY is improved. Therefore, in a case where the output luminance signal output from the processor 103 is supplied to the present television receiver, an image having a high quality can be provided. The output, which is supplied from the MUSE-NTSC converter 102, may be directly used in the present television receiver. Moreover, if an image having a higher quality is needed, it is possible to add the processor 103 to the MUSE-NTSC converter 102, and supply the output signal of the processor 103 to the present television receiver.

Furthermore, in the present invention, number of the scanning lines of S terminal luminance signal whose quality is improved can be converted into the sequential scanning signal, and can be directly used in the high-definition television receiver. In this case, a motion adjustable sequential scanning converter 104 is connected to the processor 103. In other words, S terminal luminance signal SY is input to the motion adjustable sequential scanning converter 104. In the motion adjustable sequential scanning converter 104, the interlaced scanning signal is converted into the sequential scanning signal (525/1:1). In this case, in a still picture, a flicker component between the fields, which is special to the sequential scanning, is removed therefrom. However, in a moving picture, a vertical resolution is lowered since the motion adjustable sequential scanning converter 104 performs a sequential scanning conversion in the fields.

Therefore, in the still picture, a sequential scanning signal, in which the flicker between the frames with the flicker between the fields are removed, can be obtained from the motion sequential scanning converter 104. The sequential scanning signal can be directly supplied to the high definition television receiver.

As a sequential signal which is suitable for the high definition television receiver, there are the above-mentioned luminance signal EY and color-difference signals E (R - Y) and E (B - Y). However, these signals include flicker components in the horizontal high frequency component. On the other hand, the signal obtained from the motion adjustable sequential scanning converter 104 has extremely high quality in the still picture. In the moving picture, however, the vertical resolution is lowered.

In consideration of the above, the present invention is structured to use both advantages of the signal obtained from the motion adjustable sequential scanning converter 104 and the sequential scanning signal obtained from the above-mentioned MUSE-NTSC converter 102.

Specifically, the output from the motion adjustable sequential scanning converter 104 is output to a low-band substitution circuit 105.

The low-band substitution circuit 105 comprises a subtracter 106, a low-pass filter 107, and an adder 108, and luminance signal Y (525/1:1) is supplied from the MUSE-NTSC converter 102 to the subtracter 106.

Thereby, the horizontal low-band component of the sequential scanning signal, which is obtained from motion adjustable scanning converter 104, is substituted for luminance signal Y, which is supplied from the MUSE-NTSC converter and has high vertical resolution.

The luminance signal, which is supplied from the low-band substitution circuit 105, is input to a matrix device 109. Then, the signals E (R - Y) and E (B - Y) are also supplied to the matrix device 109 from the MUSE-NTSC converter 102. The signals E (R - Y) and E (B -

Y) are sequential scanning signals as explained above. The matrix device 109 obtains R.G.B signals by use of the input signal.

According to the above-mentioned embodiment, the generation of the flicker in the signal of the still picture is prevented. Also, the signal, which is supplied from the MUSE-NTSC converter and which is not interlaced, can be used as a horizontal low-band component, thereby the picture having high vertical resolution can be obtained in the moving picture.

FIGS. 2A to 2D explain the circuit of the above embodiment in more detail.

Figure 2A:
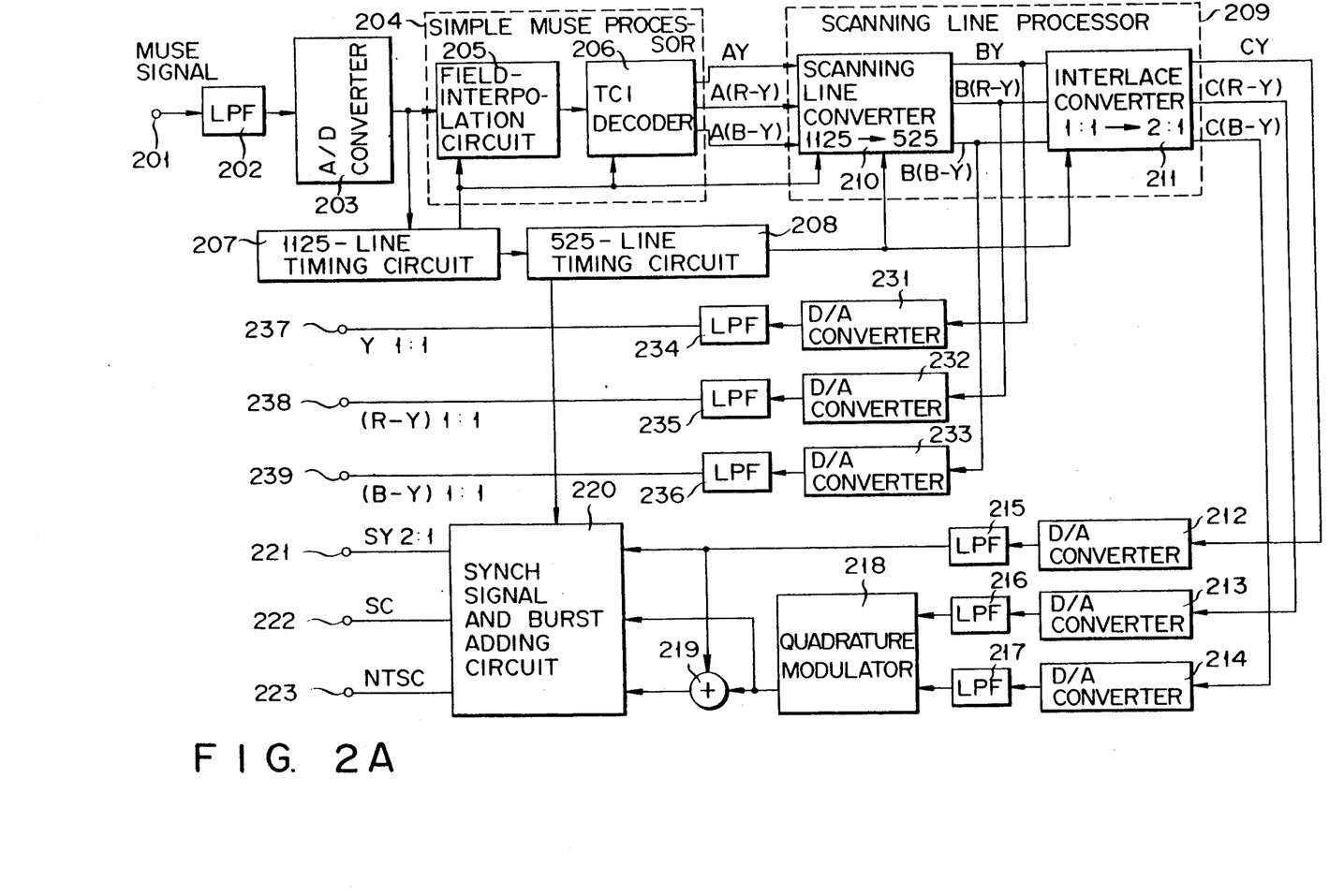
FIG. 2A is a structural view showing the structure of a MUSE-NTSC converter of FIG. 1.

FIG. 2A shows the structure of the MUSE-NTSC converter 102. A MUSE signal is supplied to an input terminal 201, and further supplied to an A/D converter 203 via a low-band filter 202 having a bandwidth of 8.1 MHz. The A/D converter 203 digitizes the MUSE signal by a clock rate of 16.2 MHz. The output of the A/D converter 202 is input to an intrafield-interpolation circuit 205, which constitutes a simple MUSE processor 204, and a timing circuit 207 (1125 system). The intrafield interpolation circuit 205 performs an interpolation process using one field for the MUSE signals.

The intrafield-interplated signal is input to a TCI decoder 206. The TCI decoder 206 expands the time axis of the two color-difference signals, which are multiplexed for a horizontal branking period of the luminance signal, and outputs the time-expanded signals. The luminance signal AY, and the color-difference signals A (R - Y) and A (B - Y) obtained from the TCI decoder 206 are input to a scanning line processor 209.

A timing signal is supplied to the scanning line processor 209 from the timing circuit 207 (1125 system) and the timing circuit 208 (525 system). The timing circuit 207 separates a synch signal from the output of the A/D converter 203 and reproduces a clock, thereby generating various timing signals. A part of the timing signals output from the timing circuit 207 is also supplied to the timing circuit 208 (525 system).

The scanning line processor 209 comprises a scanning line converter 210 and an interlace conversion processor 211. The output signals are supplied to the scanning line converter 210 from the TCI decoder 206. In a scanning line converter 210 a sequential scanning signal (1125 system) is processed to be converted to a sequential scanning signal (525 system). The converted luminance signal BY and the color-difference signals B (R - Y) and B (B - Y) are supplied to the interlace converter 211. In the interlace converter 211, the sequential signals (525/1:1) are processed to be converted to interlaced scanning signals (525/2:1). These interlaced scanning signals, that is, luminance signal CY, color-difference signals C (R - Y) and C (B - Y) are respectively converted to analog signals by D/A converters 212, 213, 214, and supplied to low-pass filters 215, 216, and 217 constituting an NTSC encoder. The output of the low-pass filter 215 is supplied to a synch signal and a burst adding circuit 220. Also, the outputs of the low-pass filters 216 and 217 are supplied to a quadrature modulator 218, and modulated to carrier color-difference signals of 3.58 MHz. Thereafter, these signals are supplied to the synch signal and the burst adding circuit 220, and an adder 219. In the adder 219, the color-difference signal and the luminance signal are synthesized, and supplied to the synch signal and the burst adding circuit 220. An NTSC system composite image signal in which the synch signal and the burst signal are added to the output of the adder 219 can be obtained in an output terminal 223 from the synch signal and the burst adding circuit 220. Also, S terminal luminance signal SY in which the synch signal is added to the output of the low-band filter 215 can be obtained in an output terminal 221. Moreover, S terminal color-difference signal in which the burst signal is added to the output signal of the quadrature modulator 218 is obtained in an output terminal 222.

The sequential scanning signals obtained from the scanning line converting processor 210, that is, luminance signal BY, color-difference signals B (R - Y) and B (B - Y) are respectively supplied to D/A converters 231, 232, 233 and converted into the analog signals. The analog signals are output to output terminals 237, 238, and 239 via low-pass filters 234, 235, and 236. The signals obtained in the terminals 237, 238, and 239 are the above-mentioned luminance signal EY and color-difference signals E (R - Y) and E (B - Y).

Figure 2B:
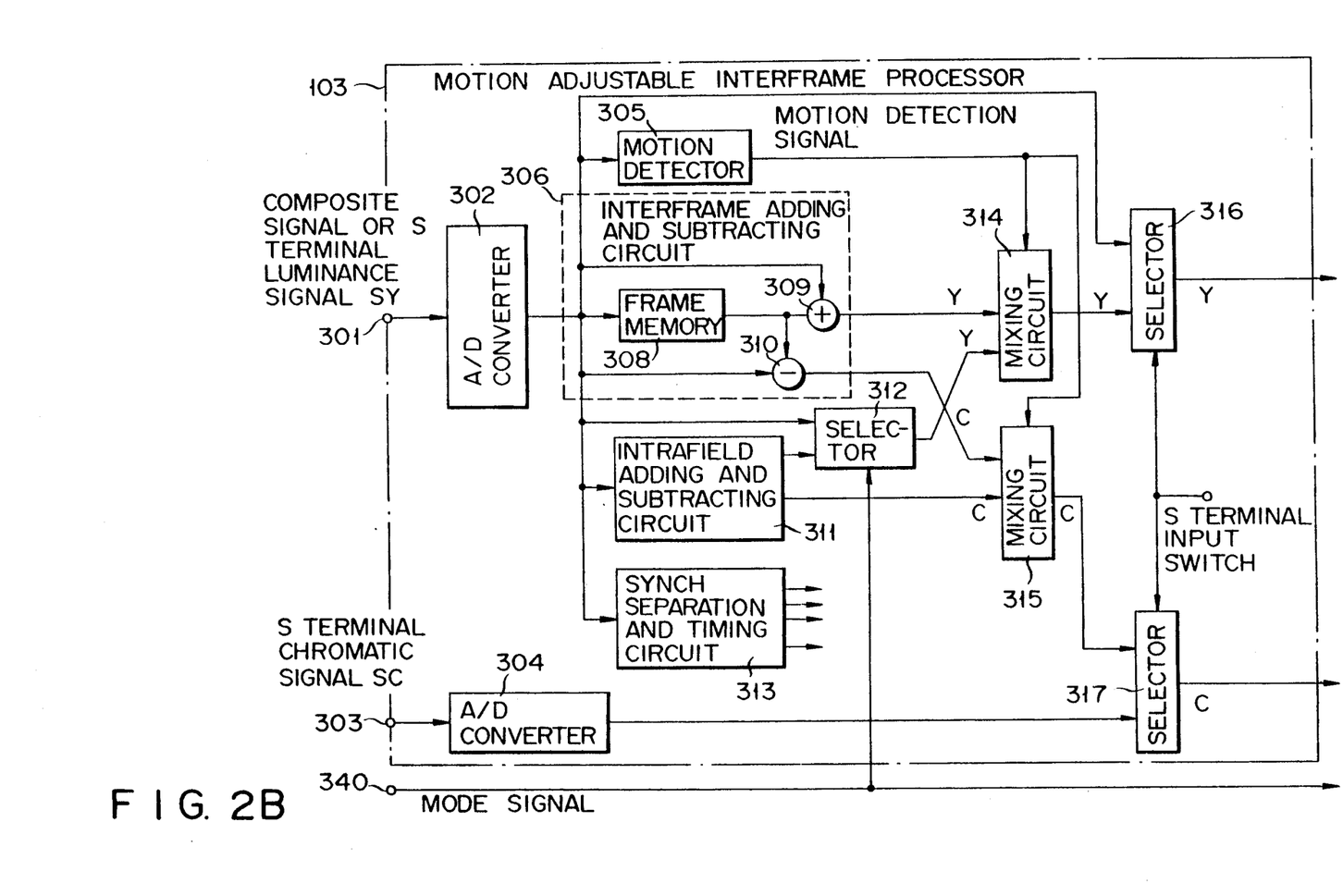
FIG. 2B is a block diagram showing a Y-C separation device of FIG. 1.

FIG. 2B shows the motion adjustable interframe processor 103 of FIG. 1 in more detail. But the processor 103 is 3D Y/C separator, it is a proper structure for processing the signals between the frames described in this embodiment.

Specifically, the signal of the NTSC system or S terminal input luminance signal SY are selectively supplied to an input terminal 301 from the MUSE-NTSC converter 102, introduced to an A/D converter 302. Terminals 221 and 233 of FIG. 2 are selectively connected to the terminal 301 of FIG. 2B by a switch (not shown). To operate the circuit shown in FIG. 1, S terminal input luminance signal SY is selected, and supplied to the terminal 301. Also, S terminal color signal SC is supplied to a terminal 303.

S terminal luminance signal SY and S terminal color signal SC are the signals in which the luminance and color signals are separated from each other in advance.

The digital signal supplied from the A/D converter 302 is input to a motion detector 305 and an interframe adding and subtracting circuit 306. The adding and subtracting circuit 306 comprises a frame memory 308, an adder 309, and a subtracter 310. A luminance signal Y is obtained from the adder 309 and a color signal C is obtained from the subtracter 310. Since the adding and subtracting circuit 306 performs the separation between the luminance and color signals by the use of the signals between the frames, this is useful to reduce the flicker component generated between the frames when the input signals are still images. Moreover, the digital signal supplied from the A/D converter 302 is supplied to an intrafield Y/C separation circuit 311 which is useful in a case where the input signals are moving images. In other words, by the fact that a color subcarrier is inverted every frame, the adding and subtracting circuit 306 performs the separation between the luminance signal and the color signal by the sum of the signals and the difference of the signals between the frames in the still portion of the image. Moreover, by the signal in the field, the circuit 311 performs the separation between the luminance signal and the color signal by a comblike filter and the like. Moreover, the digital signal supplied from the A/D converter 302 is supplied to one the input terminals of a selector 312. The luminance signal separated by the circuit 311 is supplied to the other input terminal of the selector 312. When S terminal luminance signal SY is processed, the selector 312 selects the output signal of the A/D converter 302, and the output signal is supplied to one of the input terminals of a mixing circuit 314. The luminance signal separated by the circuit 306 is supplied to the other input terminal of the mixing circuit 314. The selector 312 is controlled by a mode signal supplied from a terminal 340. The mode signal is generated when a user operates an operation section.

The mixing rate of the two luminance signals supplied to the mixing circuit 314 are controlled in accordance with a motion detecting signal supplied from the motion detection circuit 305. Also, the mixing rate of the color signals separated by the circuits 306 and 311 are controlled in accordance with a motion detecting signal supplied from the motion detection circuit 305. The luminance signal is supplied from the mixing circuit 314 to one end of the selector 316, and the color signal is supplied from the mixing circuit to one end of the selector 317. S terminal luminance signal SY is input to the other end of the selector 316 and S terminal color signal SC is input to the other end of the selector 317. The selectors 316 and 317 basically select the outputs of the mixing circuits 314 and 315, respectively. The control signal for the selectors 316 and 317 is supplied to a switching terminal. Also, S terminal color signal SC is supplied to the selector 317 via the input terminal 303 and the A/D converter 304. A synchronous separation and timing circuit 313 to which the output of the A/D converter 302 is input separates a synchronous signal and generates a timing signal for each circuit.

Figure 2C:
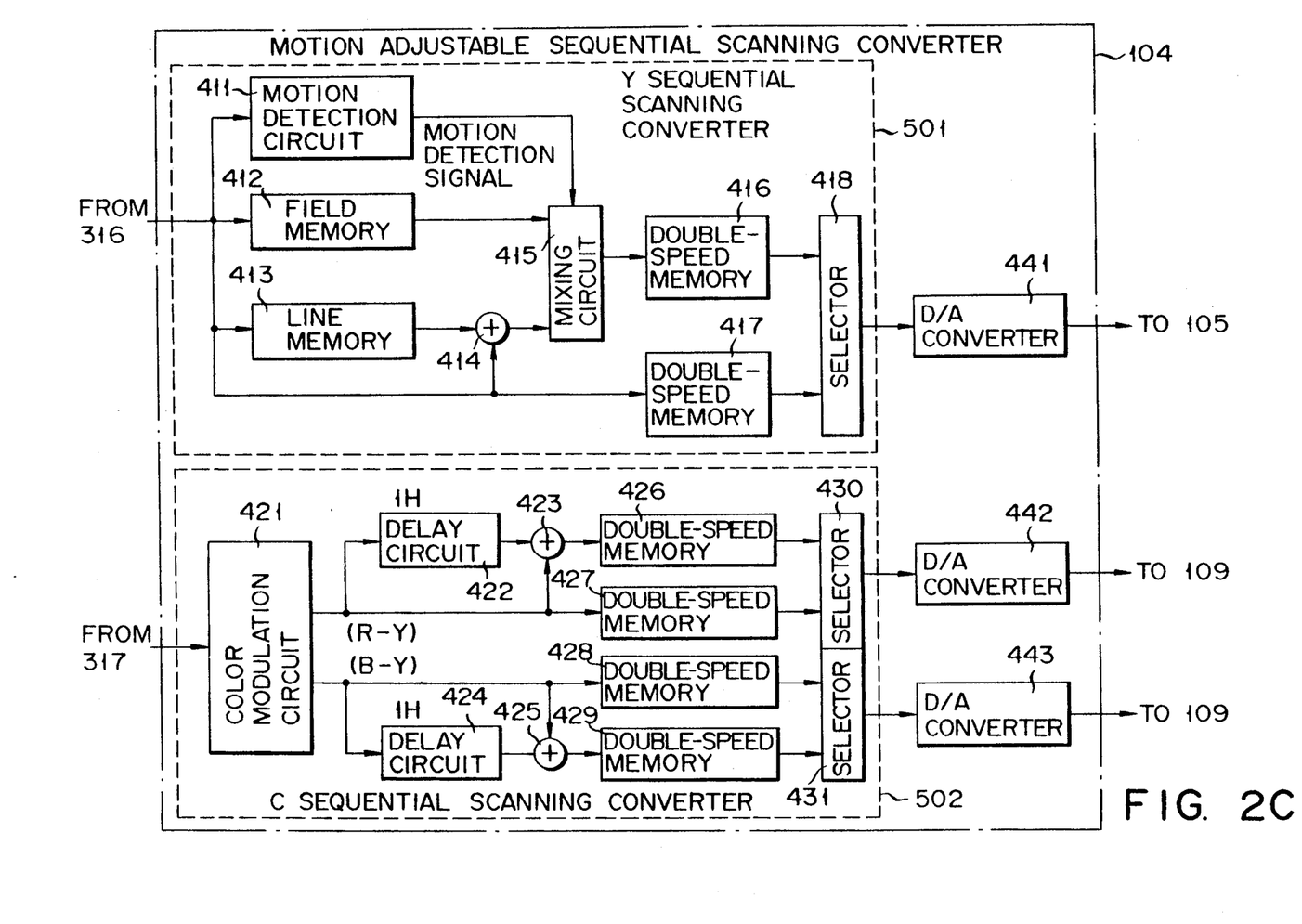
FIG. 2C is a block diagram showing a motion adjustable sequential scanning converting means of FIG. 1.

The luminance signal supplied from the selector 316 is supplied to a Y sequential scanning converter 501 of the motion adjustable sequential scanning converter 104, and the color signal supplied from the selector 317 is supplied to a C sequential scanning converter 502 shown in FIG. 2C.

Y sequential scanning converter 501 has a motion detector 411 to which an input luminance signal is supplied and a field memory 412, and a line memory 413. The output and input of the line memory 413 are added by an adder 414 and the average value is calculated, thereafter the average is supplied to one end of a mixing circuit 415. The output of the field memory 413 is supplied to the other end of the mixing circuit 415. The mixing rate of the mixing circuit 415 is controlled in accordance with the motion detection signal supplied from the motion detection circuit 411. The motion detection circuit 411 detects the portion of the moving picture and that of the still picture by the difference between the frames, thereby obtaining a motion detection signal.

The output of the mixing circuit 415 is supplied to a double-speed memory 416 and read out at twice the normal horizontal scanning speed. Also, the output supplied from the selector 316 is directly supplied to the double memory 417 and read out at twice speed the normal horizontal scanning speed. The signals of the double-speed memories 416 and 417 are alternately read out at twice the horizontal scanning speed. Since these signals are alternately selected and supplied, the sequential scanning signal (525/1:1) can be obtained.

On the other hand, the color signal supplied from the selector 317 is supplied to a color demodulation circuit 421 and is demodulated to a color-difference signal. (R - Y) and (B - Y) signals are supplied to lH delay circuits 422 and 423, respectively. An adder 423 adds the input and output of the lH delay circuit 422, outputs the average, and the average is supplied to a double-speed memory 426. The double-speed memory 426 and a double-speed memory 427 in which (R - Y) signal is directly supplied from the color demodulation circuit 421 are alternately read out at twice the normal horizontal scanning speed, and the outputs are alternately selected by a selector 430 and introduced. Therefore, in (R - Y) signal, the number of scanning lines converted is doubled. The process system of (B - Y) signal comprises a lH delay circuit 424, an adder 425, double-speed memories 428 and 429, and a selector 431.

Figure 2D:
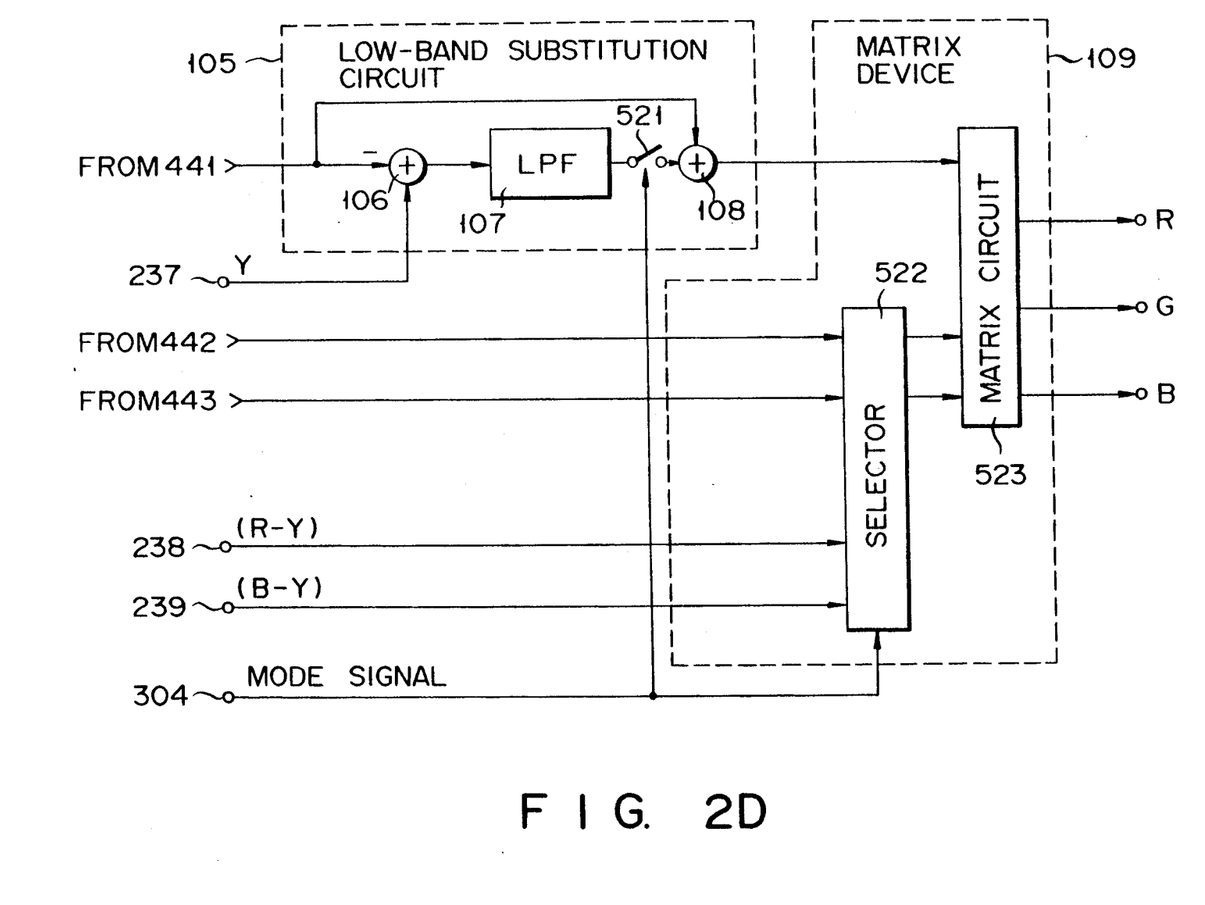
FIG. 2D is a block diagram showing a low-band substitution circuit and a matrix device of FIG. 1.

The luminance signal, which is supplied from the selector 418, and (R - Y) and (B - Y) signals, which are supplied from the selectors 430 and 431, are converted into analog signals by D/A converters 441, 442, and 443, respectively, and supplied to a matrix device 109 shown in FIG. 2D.

The matrix device 109 comprises, a selector 522, and a matrix circuit 523. The color-difference signal (R - Y) from the terminal 238 and the color-difference signal (B - Y) from the terminal 239 are supplied to the selector 522. Color-difference signal (R - Y), which is supplied from a D/A converter 442, and color-difference signal (B - Y), which is supplied from a D/A converter 443, are supplied to the selector 522. The selector 522 selects either color-difference signals (R - Y) (B - Y) in accordance with the mode signal, and supplies the signals to the matrix circuit 523. When the mode signal shows the process of output of the MUSE-NTSC converter, the switch of the selector 522 is changed to select the color-difference signals (R - Y) and (B - Y) from the terminals 238 and 239. The matrix circuit 523 generates color signals R.G.B. by use of the luminance signal from the low-band substitution circuit 105 and the color-difference signals (R - Y) and (B - Y), and outputs the signals to the output terminal. Since the vertical resolution of the sequential scanning signal, which is obtained from the D/A converter 441, is lowered in the portion of the moving image, the low-band substitution circuit 105 is provided to improve the vertical resolution. Therefore, the switch 521 may be controlled to be turned on only when the signal is the moving image.

In the above embodiment, each part of the circuit of FIG. 1 is structured as shown in FIGS. 2A to 2D. However, the present invention is not limited to the above embodiment.

In a case where the circuit of FIG. 1 is used only for the signal of MUSE system, the Y/C separation circuit 103 need not be complicated unlike the circuit of FIG. 2B. The structure of the circuit may be as shown in FIG. 1. In other words, the circuit may comprise a motion detector, an interframe adder, and a mixing circuit. Also, the motion adjustable sequential scanning converter 104 need not be complicated unlike the converter of FIG. 2C. The motion adjustable sequential scanning converter may comprise only the process system of the luminance signal. Moreover, the structure of the matrix device 109 need not be as in the structure of FIG. 2D. The matrix circuit 523 of FIG. 2 may be directly connected to terminals 238 and 239.

Figure 3:
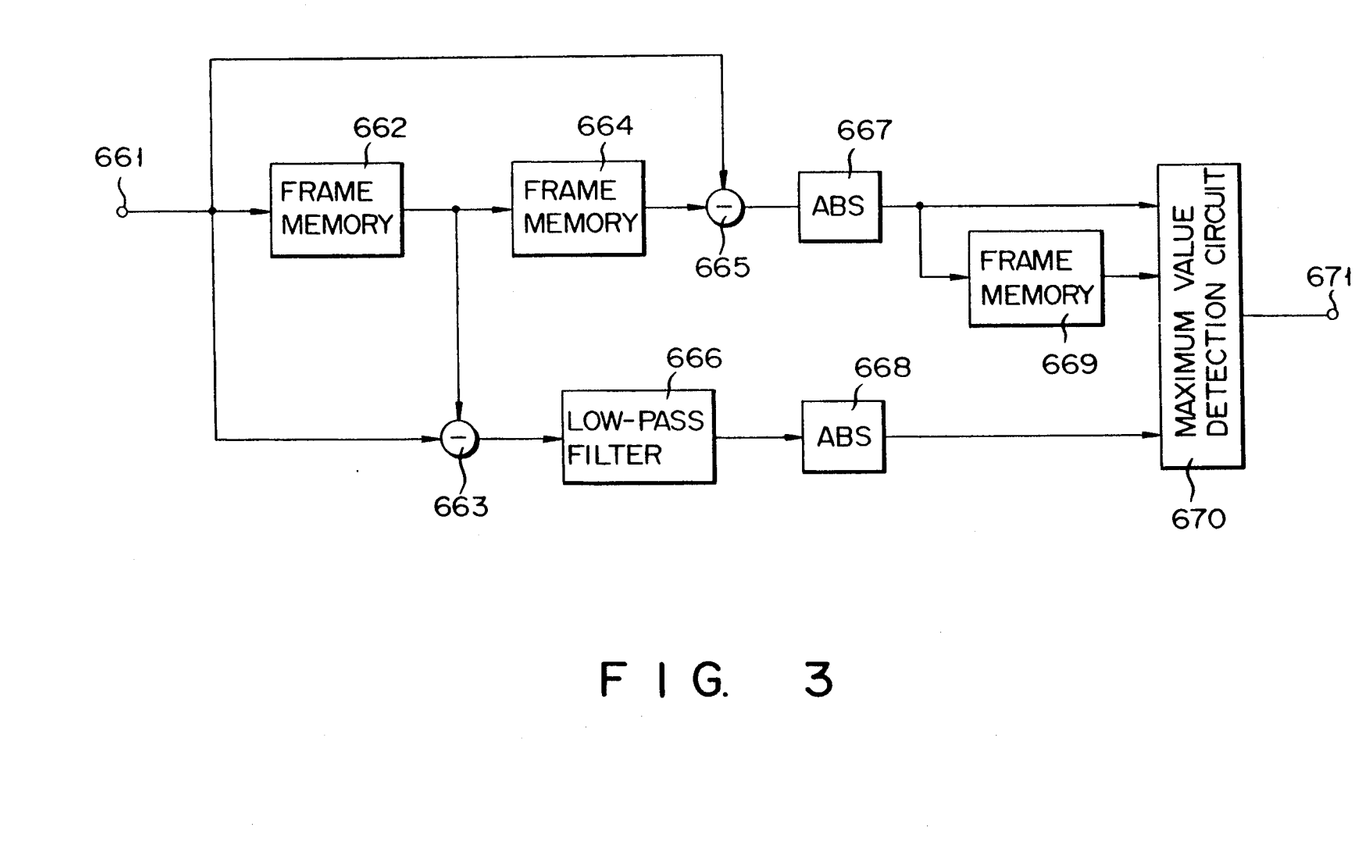
FIG. 3 is a block diagram showing a motion detection circuit of FIG. 2B in more detail.

FIG. 3 is a view showing a specific example of the motion detector 305.

A digital image signal is supplied from the A/D converter 302 to a frame memory 662, and subtracters 663 and 665. The output of the frame memory 662 is further supplied to a frame memory 664. The subtracter 663 calculates the difference (interframe difference signal) between the input of the frame memory 662 and the output, and the difference is supplied to a low-pass filter 666. The cutoff frequency of the low-pass filter 666 is set to about 2 MHz in order to prevent the influence of the color-difference signal due to the motion detection.

The output of the low-pass filter 666 is input to an absolute circuit 668. The subtracter 665 calculates the difference (difference signal between two frames) between the input of the frame memory 662 and the output of the frame memory 664, and the difference is supplied to an absolute circuit 667.

The output of the absolute circuit 667 is directly supplied to a maximum value detector 670 and the output of the absolute circuit 668 is also supplied to the maximum value detector 670.

A motion detection signal can be normally obtained from the difference signal between the frames. In the case of NTSC system, since a color subcarrier is inverted and multiplexed every frame, the difference signal between two frames is required. Moreover, the difference signal between two frames is delayed by one frame, and is used as a motion detection signal for the moving image portion which is before the omitted one frame. The maximum detector 670 introduces the signal as the maximum motion detection signal of three signals to an output terminal 671.

We claim:

1. A television signal converter, to which a band-compressed high definition signal is supplied, the television signal converter comprising:
   a simple high definition signal processor into which the high definition television signal is input, the output of which is a simple high definition television signal including a luminance signal and color difference signals; and
   a scanning line processing means for producing a first sequential scanning signal and a first interlaced scanning signal, comprising:
   scanning line converting means, for receiving the simple high definition television signal is supplied, and generating the first sequential scanning signal including luminance signal and color difference signals, which has t least the same number of scanning lines as a television signal of a standard television receiver and which can also be used as an extended definition television signal; and
   interlace converter means, coupled so as to receive the first sequential scanning signal, for generating the first interlaced scanning signal including a luminance signal and color difference signals, which can also be used by a standard television receiver.

2. A television signal converter according to claim 1, wherein the simple high definition signal processor comprises a field interpolation circuit, for generating an intrafield-interpolated signal, and a TCI (time compressed integration)-decoder, for receiving the intrafield-interpolated signal and generating a luminance signal and time-expanded color-difference signals.

3. A television signal converter according to claim 1, further comprising:
   D/A converters for individually receiving the luminance signal and color-deference signals composing the first sequential scanning signal and generating the analog form of the received signals; and
   low-band filters for receiving the individual analog signals and generating band-compressed analog luminance and color-difference signals.

4. A television signal converter according to claim 1, further comprising:
   D/A converters for individually receiving the luminance signal and color-difference signals composing the first interlace scanning signal and generating the analog form of the received signals; and
   low-band filters for receiving the individual analog signals and generating band-compressed analog luminance and color-difference signals; and
   a quadrature modulator for receiving the band-compressed, analog color-difference signals generated by the low-band filters; and
   a synch signal and burst adding circuit, for receiving a band-compressed analog luminance signal, a color-difference signal output of the quadrature modulator, and a color-difference signal output of the quadrature modulator that has been coupled with the band-compresses analog luminance signal, which generates a terminal luminance signal, a terminal color-difference signal and an NTSC composite image signal, respectively.

5. A television signal converter according to claim 1, wherein said television signal converter comprises interframe adding means for adding interframe signals of the said first interlaced scanning signal in order to remove a flicker component, and for obtaining a second interlaced scanning signal.

6. A television signal converter according to claim 5, wherein said interframe adding means comprises:
   an interframe adder in which the first interlaced scanning signal is supplied;
   a first motion detector in which the first interlaced scanning signal is supplied; and
   a first mixing circuit in which the output of said interframe adder and said first interlaced scanning signal are supplied and the mixing rate thereof is controlled in accordance with the motion detection signal supplied from said motion detector.

7. A television signal converter according to claim 5, wherein said television signal converter comprises a motion adjustable sequential converting means in which an interpolation signal is generated by use of said second interlaced scanning signal in order to obtain a sequential scanning signal, which can be used in the high-definition television, by use of said second interlaced scanning signal obtained by said interframe adding means, whereby the interpolation signal and the second interlaced scanning signal are respectively converted at double speed, and two signals, which are converted at double speed, are alternately selected, thereby introducing a second sequential scanning signal.

8. A television signal converter according to claim 7, wherein said motion adjustable sequential scanning converting means comprises:
   a second motion detector in which said second interlaced scanning signal is supplied;
   a field memory in which said second interlaced scanning signal is supplied;
   a line memory in which said second interlaced scanning signal is supplied;
   an adder for adding the output of the line memory and said second interlaced scanning signal;
   a second mixing circuit in which the output of the adder and the output of said field memory are supplied and the mixing rate of these outputs is controlled by the motion detection signal from said second motion detector;
   a first double-speed memory in which the output of said second mixing circuit is supplied, and the scanning speed is doubled;
   a second double-speed memory in which the output of said second interlaced scanning signal is supplied and the scanning speed to doubled; and a selector for alternately selecting the outputs of said first and second double-speed memories at twice the speed of the normal horizontal scanning speed and the output is introduced.

9. A television signal converter according to claim 7, wherein said television signal converter comprises low-band substitution means in which said second sequential scanning signal and said first sequential scanning signal are supplied and the low component of said second sequential scanning signal is substituted for that of the first sequential scanning signal in order to prevent the reducing of the vertical resolution of the motion image area in the second sequential scanning signal.

10. A television signal converter according to claim 9, wherein said low-band substitution means comprises means for substituting the low-band component of said second sequential scanning signal for that of said first sequential scanning signal.

11. A television signal converter according to claim 9, wherein said low-band substitution means comprises means for substituting the low-band component of said second sequential scanning signal in the portion of the moving image of said second sequential scanning signal.

* * * * *